(12) United States Patent
Takeuchi et al.

(10) Patent No.: US 6,297,797 B1
(45) Date of Patent: Oct. 2, 2001

(54) COMPUTER SYSTEM AND CLOSED CAPTION DISPLAY METHOD

(75) Inventors: Yoshihiko Takeuchi; Yasuhiro Ishibashi, both of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/176,098

(22) Filed: Oct. 21, 1998

(30) Foreign Application Priority Data

Oct. 30, 1997 (JP) .................................................. 9-298748
Apr. 1, 1998 (JP) ................................................ 10-088787

(51) Int. Cl.[7] ............................ G09G 5/00; G09G 5/22; H04N 7/00; H04N 7/08
(52) U.S. Cl. ......................... 345/141; 345/141; 345/113; 348/468; 348/461; 348/569
(58) Field of Search .................................. 348/461, 467, 348/468, 569, 589, 600, 564, 565, 563, 588, 460; 345/113, 116, 327, 326, 328, 520, 521, 171; 382/190, 203, 209; 700/11, 17, 83, 86

(56) References Cited

U.S. PATENT DOCUMENTS

| 5,294,982 | * | 3/1994 | Salomon | 348/461 |
|---|---|---|---|---|
| 5,315,386 | * | 5/1994 | Muramoto | 348/461 |
| 5,537,151 | | 7/1996 | Orr et al. | 348/564 |
| 5,543,850 | | 8/1996 | Pratt et al. | 348/461 |
| 5,742,352 | * | 4/1998 | Tsukagoshi | 348/461 |
| 5,745,184 | * | 4/1998 | Neal | 348/468 |
| 5,751,371 | * | 5/1998 | Shintani | 348/468 |
| 5,835,153 | * | 11/1998 | Pratt | 348/461 |
| 5,920,477 | * | 6/1999 | Hoffberg | 364/418 |
| 5,999,225 | * | 12/1999 | Yagasaki | 348/468 |
| 6,115,057 | * | 9/2000 | Kwoh | 348/460 |

FOREIGN PATENT DOCUMENTS 8-298649   11/1996   (JP) .
9-501808    2/1997   (JP) .
9-65295     3/1997   (JP) .

* cited by examiner

Primary Examiner—Matthew Luu
Assistant Examiner—Wesner Sajous
(74) Attorney, Agent, or Firm—Finnegan, Henderson, Farabow, Garrett, & Dunner, L.L.P.

(57) ABSTRACT

When a digitally compressed and encoded video data stream contains line data, a line data detection circuit in a DVD decoder detects the presence of that line data, and informs a CPU of it using an interrupt signal. When the CPU receives the line data from a data register in the DVD decoder, it converts it into character information and writes the information in an image memory, or converts the line data into an on-screen display command for controlling the OSD function of the DVD decoder and issues that command.

9 Claims, 12 Drawing Sheets

COMPUTER SYSTEM AND CLOSED CAPTION DISPLAY METHOD

BACKGROUND OF THE INVENTION

The entire contents of Japanese Patent Application No. 9-298748 filed on Oct. 30, 1997 and Japanese Patent Application No. 10-88787 filed on Apr. 1, 1998 are incorporated herein by reference.

The present invention relates to a computer system having a function of displaying closed caption data included in a data stream that has been digitally compressed and encoded on a display monitor, and a closed caption display method used in that system.

In recent years, along with the development of computers and multimedia techniques, various kinds of so-called multimedia compatible personal computers have been developed. A personal computer of this type has a function of reproducing motion pictures and audio data in addition to text and graphics data.

With the advent of such multimedia computers, a DVD has gained a lot of attention as an alternative storage medium to a CD-ROM. A single DVD-ROM medium can record data of about 4.7 Gbytes about seven times the capacity of the existing CD-ROM on one side, and can record data of about 9.4 Gbytes in case of two-sided recording. Using such DVD-ROM media, titles such as movies including a large volume of video information can be reproduced with high quality on the computer.

Video information recorded on a DVD-ROM medium consists of two kinds of data, i.e., presentation data and navigation data. The presentation data is a set of video objects to be reproduced, and consists of video, subpicture, and audio data. The video data is compressed and encoded by MPEG2. As the coding schemes of subpicture and audio data, runlength coding, AC-3, and the like are supported. The subpicture data is bitmap data, and is used for displaying superimposed dialogues of a movie, selection items on a menu window, and the like. One video object can contain video data for one channel, audio data for a maximum of eight channels, and subpicture data for a maximum of 32 channels.

The navigation data is reproduction control data for controlling the reproduction sequence of the presentation data, and navigation commands can be embedded in this data. The navigation commands are used for changing the reproduction contents or order of video data. Using the navigation commands, a title creator can define various branch structures in his or her title, and can create an interactive title.

When a title stored in a DVD is to be reproduced on a computer, data read out from a DVD-ROM drive is loaded onto a main memory of the computer, and is then transferred to an MPEG2 decoder. The MPEG2 decoder descrambles an encoded video data stream, which has been scrambled to prevent the title from being illicitly copied, and then decodes to expand the encoded video data stream. The decoded video data is displayed on a display monitor or an external TV under the control of a display controller.

A title stored in a DVD is normally created for the purpose of reproduction on a home TV using a home-use player. For this reason, the contents of the title often include closed caption data which is popularly used in a TV video signal, in addition to subpicture data.

The closed caption data is character data superposed on line 21 during the vertical blanking period of the TV video signal, and in the United States, most of home TVs have a function of displaying the closed caption data. Upon displaying the closed caption data, the viewer can confirm the contents of the TV video not only by audio information but also character information. In an MPEG2 stream that forms a DVD title, closed caption character data is called "line 21 data".

As described above, as a method of reproducing a DVD title using a computer, there are two methods, i.e., a method of connecting a home TV to the NTSC output of the computer, and watching the title on that TV, and a method of directly watching the title on a display monitor of the computer.

A case will be examined below wherein a DVD title that contains closed caption character data as line 21 data is reproduced.

When the contents of the DVD title are watched using a home TV, the closed caption character data can be displayed on the TV screen as character information that helps viewing the video, as long as the TV is closed caption compatible. However, when the contents of the DVD title are directly watched on the display monitor of the computer, its display screen is controlled by a display controller which is incompatible with closed caption, and the viewer cannot watch closed caption information.

BRIEF SUMMARY OF THE INVENTION

It is an object of the present invention to provide a computer system that can display closed caption data contained in a video data stream such as a DVD title, that has been digitally compressed and encoded, on a display monitor of a computer, and a closed caption display method used in the system.

In order to achieve the above object, according to the present invention, there is provided a computer system having a decoder for decoding digitally compressed and encoded data, and a display controller which has a video input port for receiving data decoded by the decoder, and displays data input from the video input port on a display monitor, the decoder including means for detecting closed caption character data from the digitally compressed and encoded data or decoded result data thereof, and means for issuing an interrupt signal to pass the detected closed caption character data to the display controller, the system comprising output means for acquiring the closed caption character data from the decoder and outputting the character data to the display controller in response to the interrupt signal, character information corresponding to the acquired closed caption character data being displayed on the display monitor.

In this computer system, when digitally compressed and encoded video data includes closed caption character data as line 21 data, the presence of the closed caption character data is detected by the decoder, and that data is passed on to the output means using an interrupt signal. The output means converts the closed caption character data received from the decoder into character information, and writes it in an image memory, or displays the character information corresponding to the closed caption character data on a display monitor using an On Screen Display (OSD) function of the display controller. Using a mechanism for passing the closedt caption data detected by the decoder to the display controller via the output means, closed caption display can be controlled by software such as a DVD reproduction control program or driver. Hence, even in a system that uses an existing display controller incompatible with closed caption, character information can be displayed on the screen as in a closed caption compatible TV.

Since the closed caption display can be controlled by software, closed caption character data contained in digitally compressed and encoded data can be translated into another language by the intervention of a language translation program, and the translation result can be displayed as character information.

Also, according to the present invention, there is provided a computer system having a decoder for decoding digitally compressed and encoded data, and a display controller which has a video input port for receiving data decoded by the decoder, and displays data input from the video input port on a display monitor, the decoder including means for detecting closed caption character data from the digitally compressed and encoded data or decoded result data thereof, means for issuing an interrupt signal to pass the detected closed caption character data to the display controller, and on-screen display means for synthesizing various kinds of information designated by an external on-screen display command on frame data formed by the decoded data, and outputting the synthesizing result to the video input port of the display controller, the system comprising means for acquiring the closed caption character data from the decoder, and issuing an on-screen display command for designating display of character information corresponding to the acquired closed caption character data to the decoder, data including the character information being displayed on the display monitor.

In this computer system, the decoder includes the OSD function, and the output means converts closed caption character data received from the decoder into OSD commands and passes them to the decoder. With this processing, character information corresponding to the closed caption character data can be displayed on a window that displays data decoded by the decoder.

Furthermore, according to the present invention, there is provided a computer system having a decoder for decoding digitally compressed and encoded data, and a display controller which has a video input port for receiving data decoded by the decoder, and displays data input from the video input port on a display monitor, the decoder comprising: means for detecting closed caption character data from the digitally compressed and encoded data; means for converting the detected closed caption character data into closed caption bitmap data; an on-screen display circuit for performing at least color key conversion of the closed caption bitmap data; and means for synthesizing decoded data output from the decoder, and the closed caption bitmap data output from the on-screen display circuit, the decoded data and the closed caption bitmap data being synthesized inside the decoder.

In this computer system, a RISC processor in a DVD decoder detects closed caption data contained in a video stream, converts character codes of the detected closed caption data into a closed caption bitmap stream with reference to a bitmap file, and outputs it to an OSD circuit in the decoder. The OSD circuit performs color key conversion and the like of the closed caption bitmap stream, and outputs the converted data to a synthesizing circuit. Meanwhile, normal video data is decoded by the decoder and is output to the synthesizing circuit in the decoder. As a result, in the decoder, motion picture data and closed caption data are synthesized, and the synthesized data is sent to the display controller. Therefore, synchronization between the output timing of an audio signal and the display timing of the closed caption data is assured. Furthermore, since the closed caption data is sent to the display controller as a portion of YUV signals, it can be displayed not only on the display device of the computer system but also on a television receiver.

In this way, according to the present invention, since an arrangement for making closed caption display using a CPU is adopted, the closed caption display can be controlled by software such as a DVD reproduction control program. Hence, even in a computer system that uses an existing display controller incompatible with closed caption, character information can be displayed on the screen as in a closed caption compatible TV.

Furthermore, when closed caption data and motion picture data are synthesized in the DVD decoder, synchronization between the timing of audio data and closed caption display timing can be assured. Moreover, since closed caption data is output to the display controller as a portion of YUV signals, closed caption data can be displayed not only on the display screen of a personal computer but also on a television receiver.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The preferred embodiments of the present invention will be described hereinafter with reference to the accompanying drawings.

Figure 1:
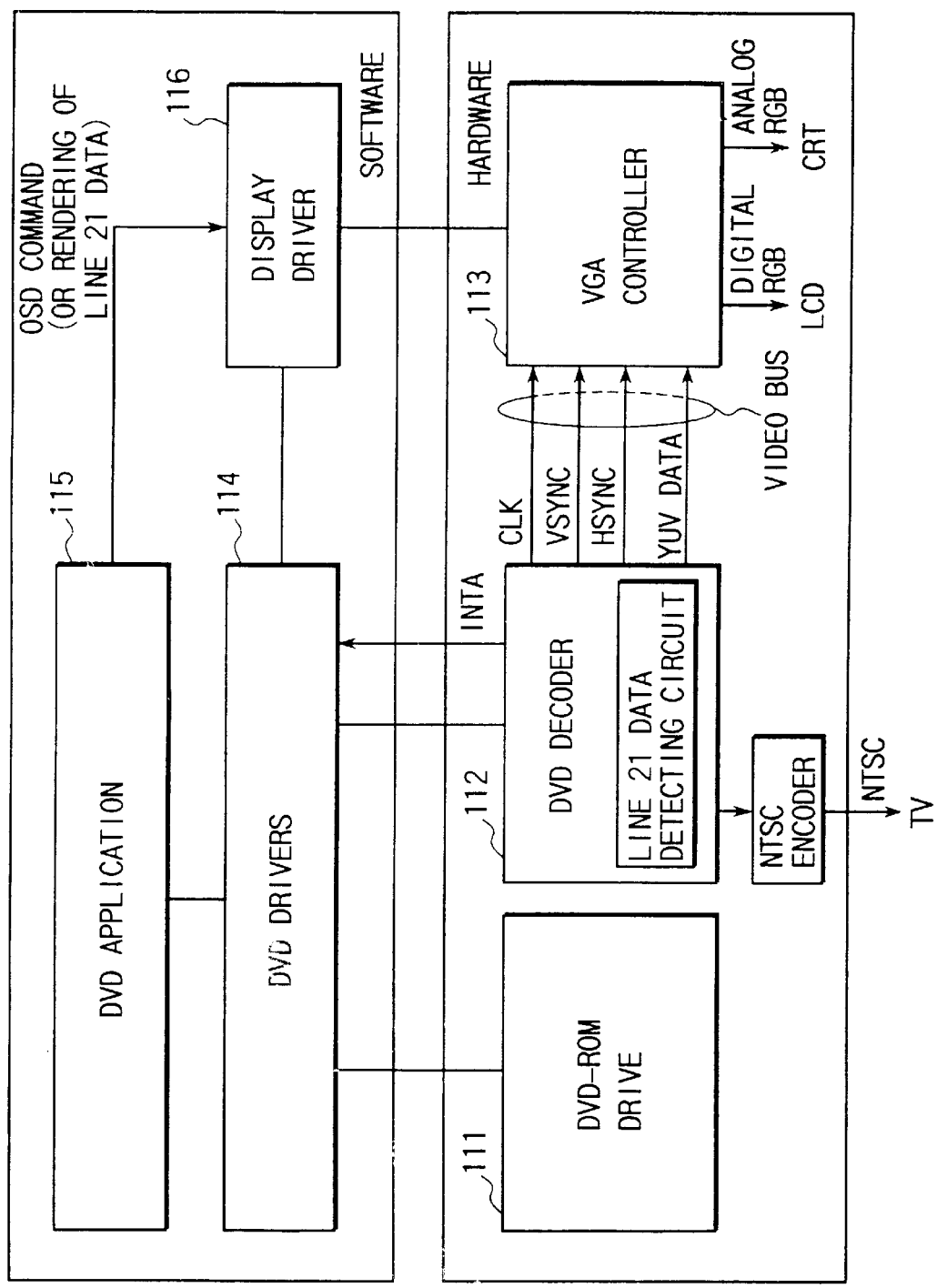
FIG. 1 is a block diagram showing the basic arrangement of a computer system according to an embodiment of the present invention.

FIG. 1 shows the basic arrangement of hardware and software of a personal computer according to an embodiment of the present invention.

The personal computer comprises, as principal hardware required for reproducing DVD video information, a DVD-ROM drive 111 which can access both CD-ROM media and DVD-ROM media, a DVD decoder 112 for decoding DVD video information (video, subpicture, and audio data) read out from the DVD-ROM drive 111, a VGA controller 113 for controlling a computer display monitor (LCD, CRT) for non-interlaced display, and the like.

A DVD-ROM medium stores video information that forms a DVD video title. Reproduction of the title on the DVD-ROM medium is controlled by DVD drivers 114, a DVD application program 115, and a display driver 116. The display driver 116 is a software driver that controls display of the VGA controller 113, and also controls the digital video input port of the VGA controller 113.

The DVD drivers 114 are software drivers for MPEG2 video control. These drivers 114 control the DVD-ROM drive 111 and DVD decoder 112 in accordance with an instruction from the DVD application program 115 to make the DVD-ROM drive 111 transfer video information to the DVD decoder 112.

The video information transferred from the DVD-ROM drive 111 to the DVD decoder 112 consists of MPEG2 program streams, each containing encoded video, subpicture, and audio data.

The video data transferred to the DVD decoder 112 by means of the MPEG2 program stream sometimes contain closed caption character data as line 21 data, as described above. In order to check the presence/absence of line 21 data, the DVD decoder 112 includes a line 21 data detecting circuit (or detector) 112a. The line 21 data detecting circuit 112a detects line 21 data from an MPEG2 program stream input to the DVD decoder 112 or from video data as the decoding result of the decoder 112, and acquires it.

The line 21 data detected by the line 21 data detecting circuit 112a is passed to a CPU of the personal computer by an interrupt signal (INTA), and operation control for displaying that line 21 data as closed caption information is done under the control of the DVD application program 115.

Video data decoded by the DVD decoder 112 is interlaced display data, and is directly input to the digital video input port of the VGA controller 113 via a dedicated video bus. The video bus is implemented by, e.g., a ZV port, and is made up of 16-bit wide digital YUV data signal lines (8-bit luminance data and 8-bit color difference data UV) corresponding to the 4:2:2 image format, and signal lines for transferring horizontal and vertical synchronization signals (HSYNC, VSYNC), and pixel clocks (CLK).

The VGA controller 113 has a function of synthesizing and displaying video data input from the video bus, and graphics data rendered into an image memory by an OS or application program running on the personal computer, an ON Screen Display (OSD) function, and the like. The OSD function is normally used for allowing the user to set various kinds of setting values such as the tone volume, channel number, and the like while displaying them on a portion of a display in equipment such as a TV, VTR, or the like. The OSD function interprets external OSD commands, and displays character information and the like on the current display screen in accordance with the interpretation result. In this embodiment, the OSD function of the VGA controller is used for displaying character information corresponding to closed caption character data.

Figure 2:
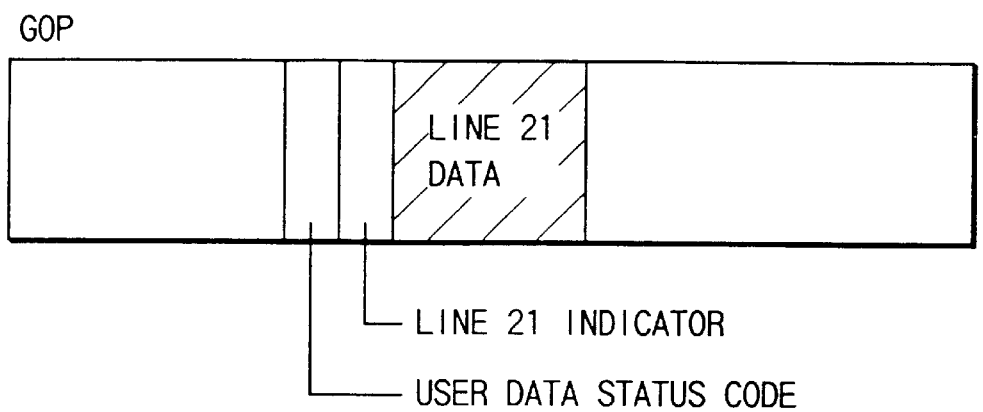
FIG. 2 is a view for explaining line 21 data contained in an encoded stream processed by the computer system of the embodiment shown in FIG. 1.

FIG. 2 shows the data format of line 21 data contained in an MPEG2 program stream.

The line 21 data is described as user data in a GOP (Group of Picture), and a user data start code indicating the beginning of the user data, and a line 21 indicator indicating that the following data is line 21 data are set at the beginning of the line 21 data. The user data start code and line 21 indicator have predetermined values.

When the line 21 data detecting circuit 112a detects line 21 data from the MPEG2 program stream input to the DVD decoder 112, it uses the user data start code and line 21 indicator in detecting the line 21 data.

Figure 3:
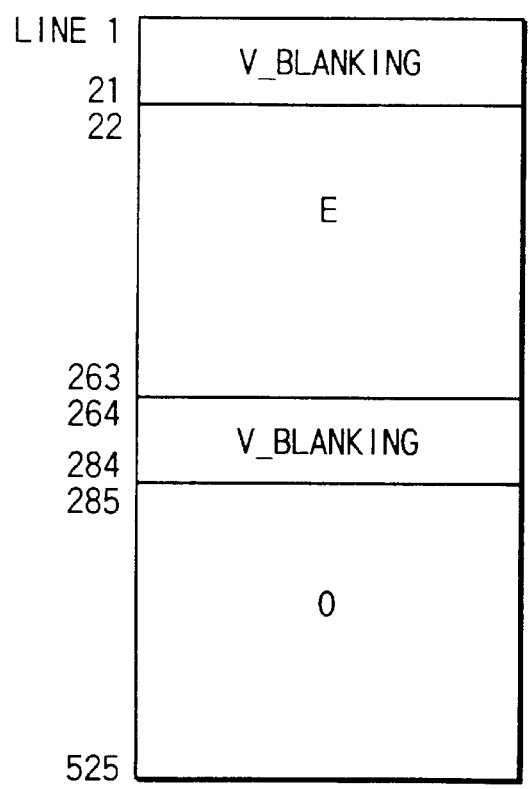
FIG. 3 shows the format of a video signal output from a DVD decoder in the computer system of the embodiment shown in FIG. 1.

FIG. 3 shows the format of digital YUV data for interlaced display, output from the DVD decoder 112.

Normally, a video signal for interlaced display consists of 525 lines from line 1 to line 525, as shown in FIG. 3. Of these lines, the periods from line 22 to line 263 and from line 264 to line 525 are respectively used for displaying even fields (E) and odd fields (O), and the periods from line 1 to line 21 and from line 264 to line 284 serve as vertical blanking periods.

When the MPEG2 program stream containing line 21 data is decoded by the DVD decoder 112, the decoding result of the line 21 data is output on line 21 during the vertical blanking period.

When the line 21 data detecting circuit 112a detects line 21 data from the decoding result of the MPEG2 program stream, it checks whether data is present on line 21 during the vertical blanking period.

In the arrangement shown in FIG. 1, when a DVD video title containing closed caption character data as line 21 data is reproduced, the line 21 data detecting circuit 112a detects and acquires line 21 data to pass it to software while the DVD decoder 112 decodes it. When the line 21 data detecting circuit 112a has detected the line 21 data, an interrupt signal (INTA) is issued, and the control is passed to a closed caption display routine in a DVD reproduction control program prepared as the DVD application program 115 in response to the interrupt signal.

The closed caption display routine receives the line 21 data detected by the line 21 data detecting circuit 112a from the DVD decoder 112. The routine converts character data included in the line 21 data into character information, and renders it into the image memory via the VGA controller 113 or directly, or issues OSD commands for directing display of the character information to the VGA controller 113. With this processing, the character information corresponding to the character information included in the line 21 data is displayed on the display screen of the display monitor which is reproducing the DVD video. Hence, even when the VGA controller 113 is incompatible with closed caption, closed caption information can be displayed.

The detailed system arrangement of the personal computer of this embodiment will be described below with reference to FIG. 4.

Figure 4:
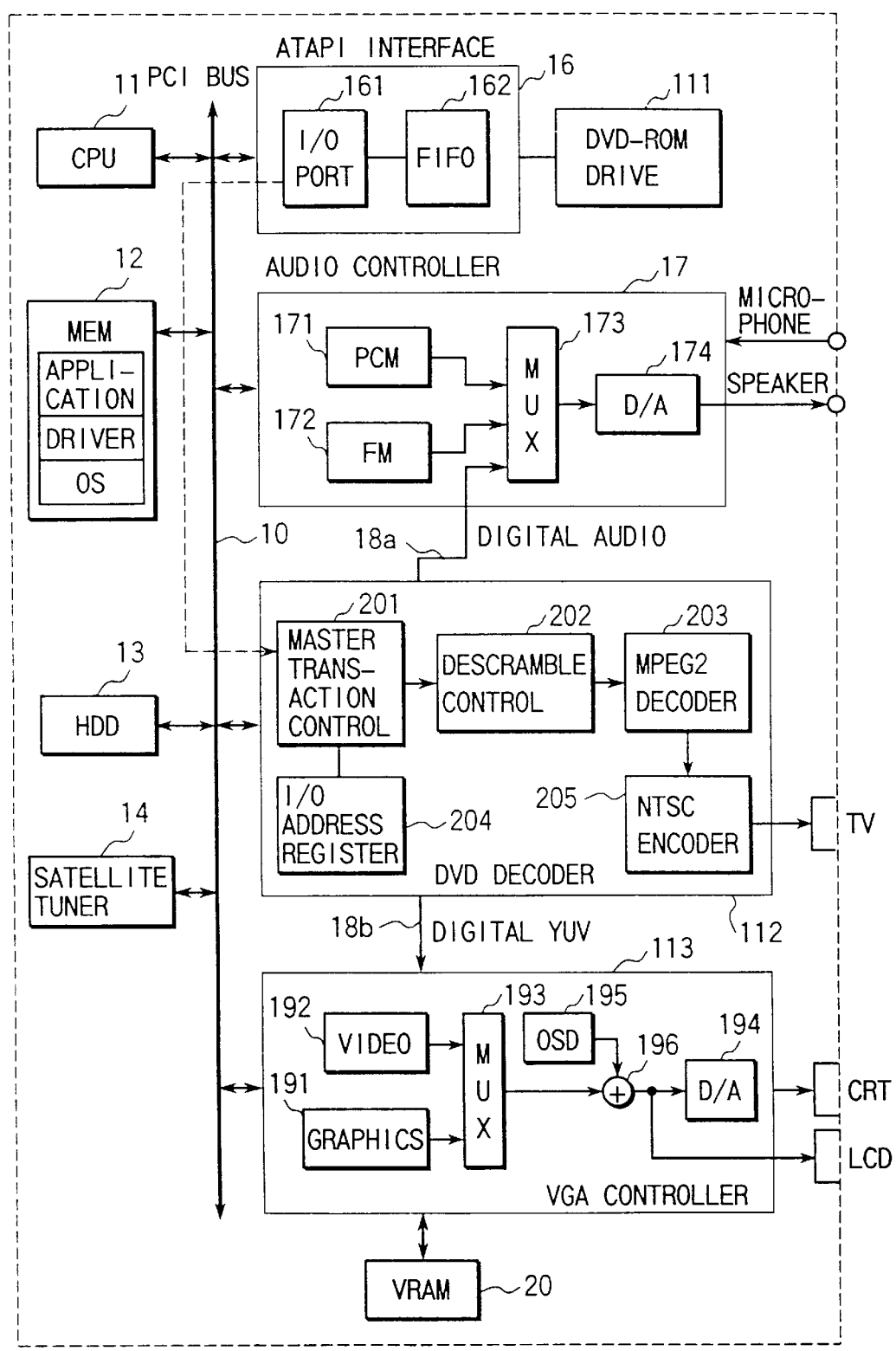
FIG. 4 is a block diagram showing the hardware arrangement of the system of the embodiment shown in FIG. 1 in detail.

This system corresponds to a notebook type personal computer, and comprises a PCI bus 10, CPU 11, main memory (MEM) 12, HDD 13, satellite tuner 14, DVD interface 16, and audio controller 17, and the abovementioned DVD-ROM drive 111, DVD decoder 112, and VGA controller 113, as shown in FIG. 4.

Figure 6:
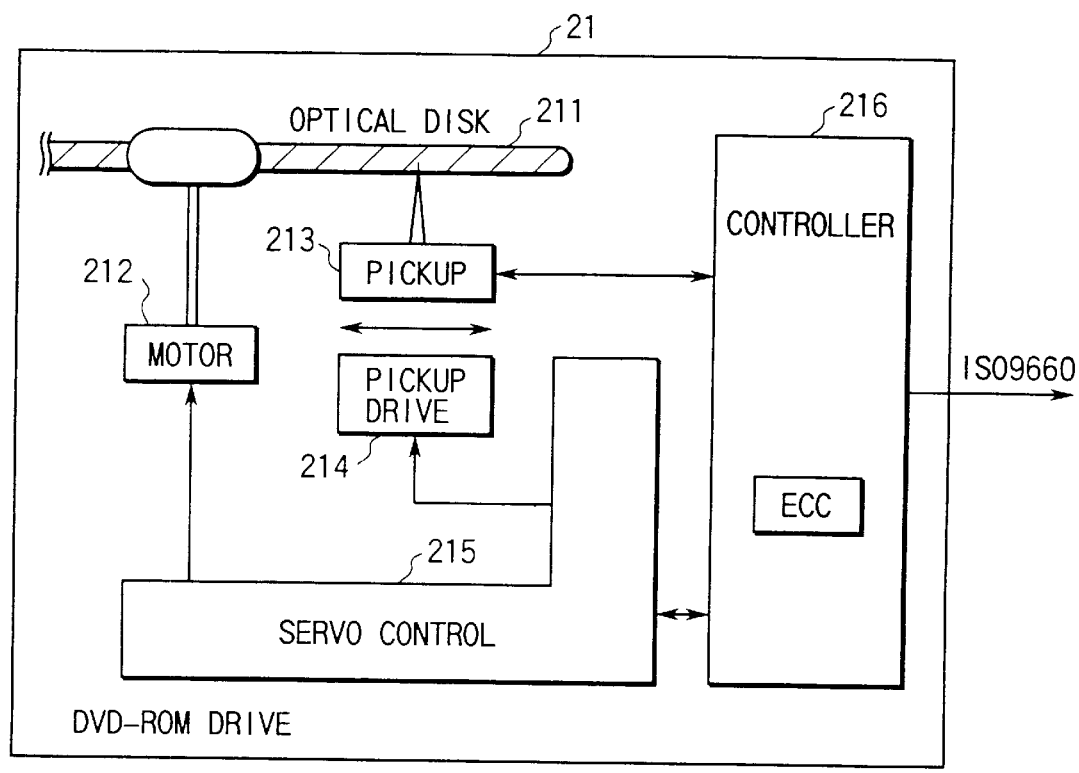
FIG. 6 is a diagram showing the arrangement of a DVD-ROM drive used in the system of the embodiment shown in FIG. 1.

The DVD-ROM drive 111 reads out a data stream stored in a DVD-ROM medium having a storage capacity of about 10 GB on both surfaces of the disk at a transfer rate of 10.8 Mbps at maximum. The DVD-ROM drive 111 comprises a DVD medium 211, motor 212, pickup 213, pickup drive 214, servo controller 215, and drive controller 216 including an ECC circuit for error detection and correction, as shown in FIG. 6. The motor 212, pickup 213, pickup drive 214, servo controller 215, and drive controller 216 serve as a drive device for driving the DVD medium 211, and reading out data recorded on that DVD medium 211.

The DVD-ROM medium 211 can record a movie for about 135 min on one side. The movie information can contain main video data (video), sub-video data (subpicture) for a maximum of 16 channels, and audio data (audio) for a maximum of 32 channels.

In this case, these video, subpicture, and audio data are digitally compressed and encoded according to the MPEG2 standard. In the MPEG2 standard, data encoded by MPEG2 can contain other encoded data, and such encoded data are processed as a single MPEG2 program stream.

Upon encoding video data, MPEG2 is used, and upon encoding subpicture and audio data, runlength coding and DOLBY AC-3 are respectively used. In this case as well, the encoded video, subpicture, and audio data are processed as a single MPEG2 program stream.

The video data can contain the above-mentioned line 21 data as user data.

MPEG2 coding is variable rate coding; the information volume to be recorded/reproduced per unit time can be varied. Hence, as the scene has faster motion, the transfer rate of an MPEG stream that forms the corresponding frames can be increased, thus allowing high-quality reproduction of motion pictures.

Figure 5:
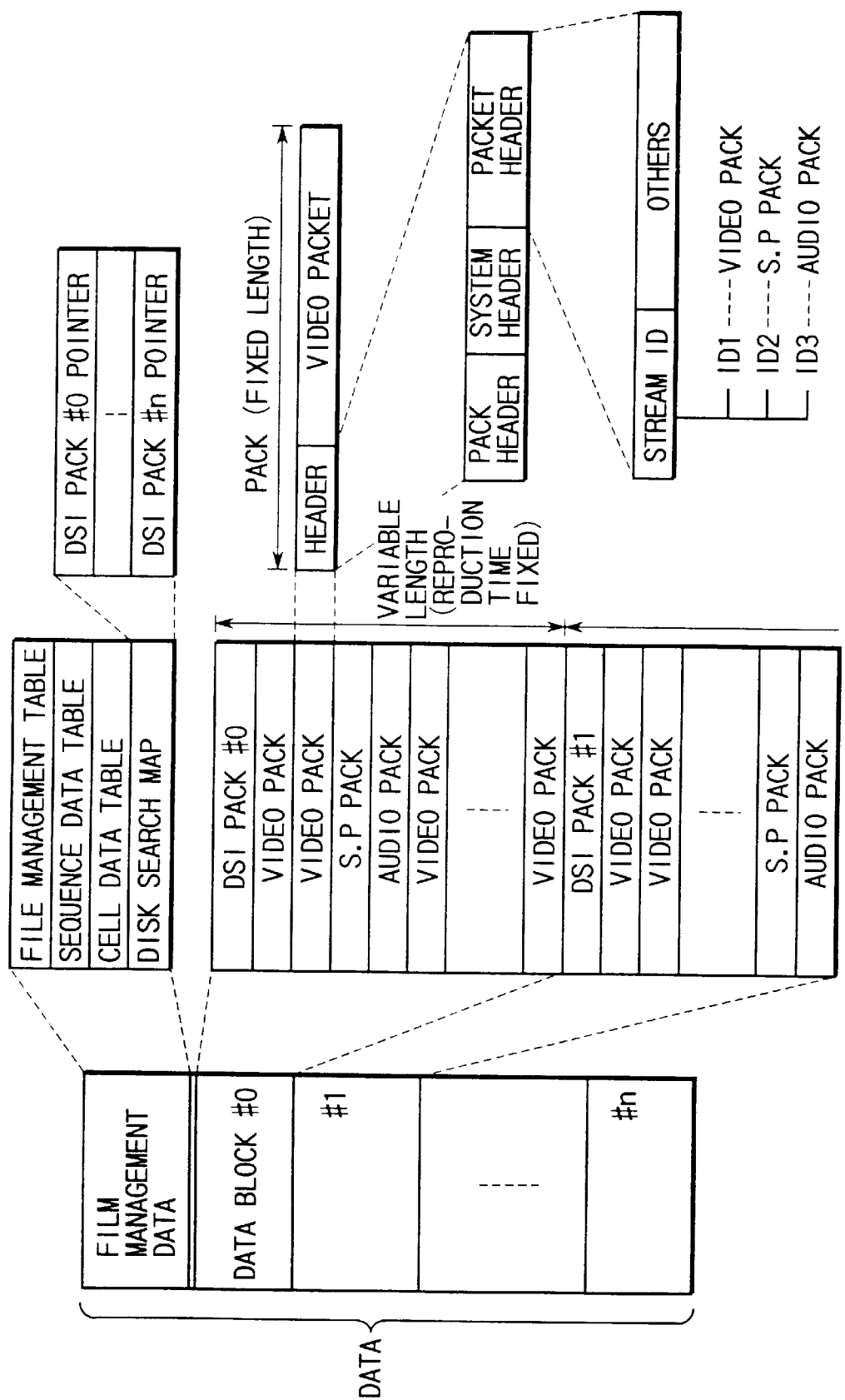
FIG. 5 shows an example of the recording format of motion picture data used in the system of the embodiment shown in FIG. 1.

In order to utilize such features of MPEG2, in this embodiment, a title such as a movie or the like is recorded on the DVD medium 211 using a data format shown in FIG. 5.

As shown in FIG. 5, one title consists of a file management information field and data field, and the data field includes a large number of data blocks (blocks #0 to #n). At the beginning of each data block, there is a DSI (Disk Serh Information) pack, and one data block is defined between two neighboring DSI packs. The storage location of each DSI pack is managed by disk search map information in the file management information field.

One data block forms information for 15 frames required for reproducing a motion picture for a predetermined period of time, e.g., 0.5 sec, and corresponds to a GOP (Group of Picture). In each data block, a video pack (VIDEO pack), subpicture pack (S.P pack), and audio pack (AUDIO pack) are multiplexed and recorded. These video pack (VIDEO pack), subpicture pack (S.P pack), and audio pack (AUDIO pack) are respectively data units of encoded video, subpicture, and audio data. The data size of each pack corresponds to the above-mentioned sector size and is fixed, but the number of packs that can be contained in one data block is variable. Hence, a data block corresponding to a scene having faster motion contains a larger number of video packs.

Each of video, subpicture, and audio packs is made up of a header field and packet field (video packet, subpicture packet, or audio packet). The packet field is the encoded data itself. The header field consists of a pack header, system header, and packet header. The packet header registers a stream ID identifying to which of the video, subpicture, and audio packets the packet corresponds.

Upon recording encoded data on a DVD, encoded data of, e.g., arbitrary sectors are scrambled using a predetermined encryption algorithm. This is to prevent illicit copies of a title.

Also, a DVD has a multi-story function of selecting and reproducing a scene group corresponding to one of a plurality of screenplays designated by the user, and a multi-angle function of selecting and reproducing one of a plurality of videos with different image sensing angles, which is designated by the user.

These functions are implemented by multiplexing a plurality of videos corresponding to the multi-story and multi-angle functions in units of, e.g., data blocks, and managing the locations and links of data blocks in units of stories or angles using disk search map information and the like.

The respective units of the system shown in FIG. 4 will be explained below.

The CPU 11 controls the operation of the overall system, and executes an operating system and an application program to be executed stored in the system memory (MEM) 12. Transfer and reproduction of data recorded on the DVD-ROM medium, and display of closed caption information are done by making the CPU 11 execute the above-mentioned DVD drivers 114, DVD application program 115, and display driver 116.

The DVD interface 16 is connected to an expansion bay called a selectable bay, which selectively mounts, e.g., IDE/ATAPI devices such as a CD-ROM drive, the DVD-ROM drive 111, an expansion second HDD, and the like to the computer main body, and transfers data with the device (DVD-ROM drive 111 in this embodiment) mounted on the selectable bay. The DVD interface 16 has a FIFO buffer 162 for temporarily holding data read out from the DVD-ROM drive 111, and an I/O port 161 for reading out data from the FIFO buffer 162 onto the PCI bus 10. The I/O port 161 comprises an I/O register that can be read by a bus master device which issues an I/O read transaction onto the PCI bus 10.

The audio controller 17 performs I/O control of sound data under the control of the CPU 11. The controller 17 comprises a PCM sound source 171, FM sound source 172, multiplexer 173, and D/A converter 174 to output sound data. The multiplexer 173 receives the outputs from the PCM and FM sound sources 171 and 172, and digital audio data transferred from the DVD decoder 112, and selects one of them.

The digital audio data is obtained by decoding audio data read out from the DVD-ROM drive 111. The digital audio data is transferred from the DVD decoder 112 to the audio controller 17 using an audio bus 18a but not the PCI bus 10. Hence, digital audio data can be transferred at high speed without influencing the performance of the computer system.

The DVD decoder 112 reads out an MPEG2 program stream from the DVD interface 16 directly or via the main memory 12 under the control of the CPU 11, demultiplexes them into video, subpicture, and audio packets, decodes these packets, and synchronously outputs the decoded packets. The DVD decoder 112 is implemented by a plurality of chip sets mounted on the system board of this computer system, and comprises a master transaction control unit 201, a descramble control unit 202, MPEG2 decoder 203, and I/O address register 204, as shown in FIG. 4.

The master transaction control unit 201 makes the DVD decoder 112 operate as a bus master (initiator) that issues transactions on the PCI bus 10, and executes an I/O read transaction to read out motion picture data from the DVD interface 16. In this case, the I/O read transaction consists of an address phase that designates the I/O port 161 of the DVD interface 16, and at least one data transfer phase that follows the address phase, and can read motion picture data by burst transfer. The I/O address value which designates the I/O port address 161 is set in the I/O address register 204 by the CPU 11.

The master transaction control unit 201 can also receive an MPEG2 program stream from the main memory 12 by normal DMA transfer.

The MPEG2 program stream read by the master transaction control unit 201 is sent to the MPEG2 decoder 203 via the descramble control unit 202. The descramble control unit 202 descrambles scrambled data contained in the MPEG2 program stream to obtain original data. The MPEG2 decoder 203 demultiplexes video, subpicture, and audio packets from the MPEG2 program stream, and decodes them.

The decoded audio data is transferred to the audio controller 17 via an audio bus 18a as digital audio data, as described above. The decoded video and subpicture data are synthesized, and are sent as digital YUV data to the VGA controller 113. In this case, the digital YUV data is transferred from the DVD decoder 112 to the VGA controller 113 using a dedicated video bus 18b, as described above, but not the PCI bus 10. Hence, the digital YUV data can be transferred at high speed without influencing the performance of the computer system, like in the digital audio data. The audio bus 18a and video bus 18b can use a ZV port.

The DVD decoder 112 also has an NTSC encoder 205 as an external chip, which can convert digital YUV data and audio data into an NTSC TV signal, and can output it to an external TV receiver.

The VGA controller 113 controls an LCD or external CRT display used as a display monitor of this system under the control of the CPU 11, and supports motion picture display in addition to text & graphics displays according to the VGA standard.

The VGA controller 113 comprises a graphics display control circuit (Graphics) 191, video display control circuit 192, multiplexer 193, D/A converter 194, OSD circuit 195, and synthesizing circuit 196 such as a blending.

The graphics display control circuit 191 is a VGA compatible graphics controller, which converts VGA graphics data rendered into a video memory (VRAM) 20 into RGB video data, and outputs the RGB video data. The video display control circuit 192 is an interface with the above-mentioned digital video input port, and has a function of performing interlaced/non-interlaced conversion using the video memory (VRAM) 20 or its internal video buffer, a YUV-RGB conversion circuit for converting YUV data, which has been converted into frame data for non-interlaced display, into RGB video data, and the like.

The multiplexer 193 selects one of the output data from the graphics display control circuit 191 and video display control circuit 192, or synthesizes the video output from the video display control circuit 192 on VGA graphics data from the graphics display control circuit 191, and outputs the selected or synthesized output to the LCD.

The OSD circuit 195 interprets an OSD command from the CPU 11, and outputs display character information designated by the OSD command. The image of the character information is synthesized on video or graphics data, or synthesized data thereof by the synthesizing circuit 196.

The D/A converter 194 converts display data from the synthesizing circuit 196 into an analog RGB signal, and outputs it to the CRT display.

The satellite tuner 14 receives video data transmitted by a digital satellite broadcast station, and transfers it to the main memory 12. When the video data coming from the digital satellite broadcast station is an MPEG2 stream, it is decoded by the MPEG2 decoder 203 in the DVD decoder 112 in the same manner as video data read out from the DVD-ROM drive 111.

Figure 7:
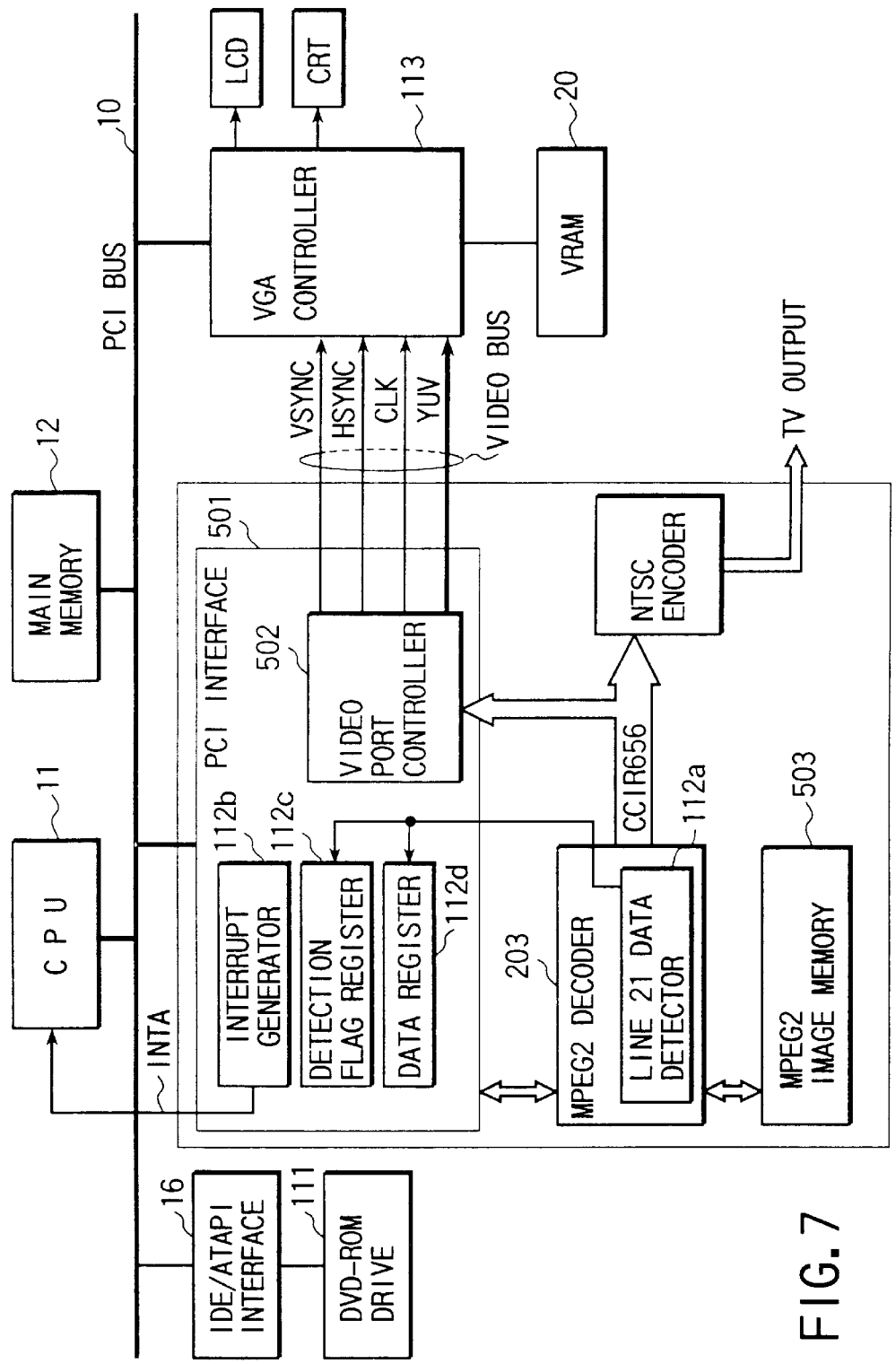
FIG. 7 is a block diagram showing an example of the detailed arrangement of the DVD decoder used in the system of the embodiment shown in FIG. 1.

FIG. 7 shows the detailed hardware arrangement of the DVD decoder 112 required for detecting line 21 data, and passing it to the CPU 11 using an interrupt signal.

A PCI interface unit 501 shown in FIG. 7 is constructed by the above-mentioned master transaction control unit 201, descramble control unit 202, and I/O address register 204. The MPEG2 program stream descrambled by the PCI interface unit is input to the MPEG2 decoder 203, and is decoded. In this case, decoding is done using an MPEG2 image memory 503.

The video data decoded by the MPEG2 decoder 203 is input to the NTSC encoder 205 and a video port controller 502 of the PCI interface unit 501. The video port controller 502 converts video data output from the MPEG2 decoder 203 into a data format suitable for outputting the data to the video port of the VGA controller 113, and outputs the vertical synchronization signal Vsync, horizontal synchronization signal Hsync, pixel clocks (CLK), and digital YUV data to the video port of the VGA controller 113, as described above with reference to FIG. 1.

Also, the PCI interface unit 501 comprises, as an interface with the CPU 11, an interrupt generator 112b, a detection flag register 112c in which a detection flag is set when a line 21 data detector 112a has detected line 21 data, and a data register 112d in which the line 21 data detector 112a sets the detected line 21 data.

In this DVD decoder 112 shown in FIG. 7, when the line 21 data detector 112a has detected line 21 data from an MPEG2 program stream, the flag is set in the detection flag register 112c, and the line 21 data is extracted from the stream and is set in the data register 112d. When the flag is set in the detection flag register 112c, the interrupt generator 112b generates an interrupt signal (INTA). In response to this signal, the CPU 11 is informed of detection of the line 21 data. The CPU 11 reads the line 21 data from the data register 112d, and displays character information corresponding to the line 21 data by means of the above-mentioned OSD commands or rendering into the VRAM 20.
(Closed Caption Data Display Method 1)

The first display method of closed caption data will be explained below while exemplifying a case wherein the OSD function of the VGA controller 113 is used.

Figure 8:
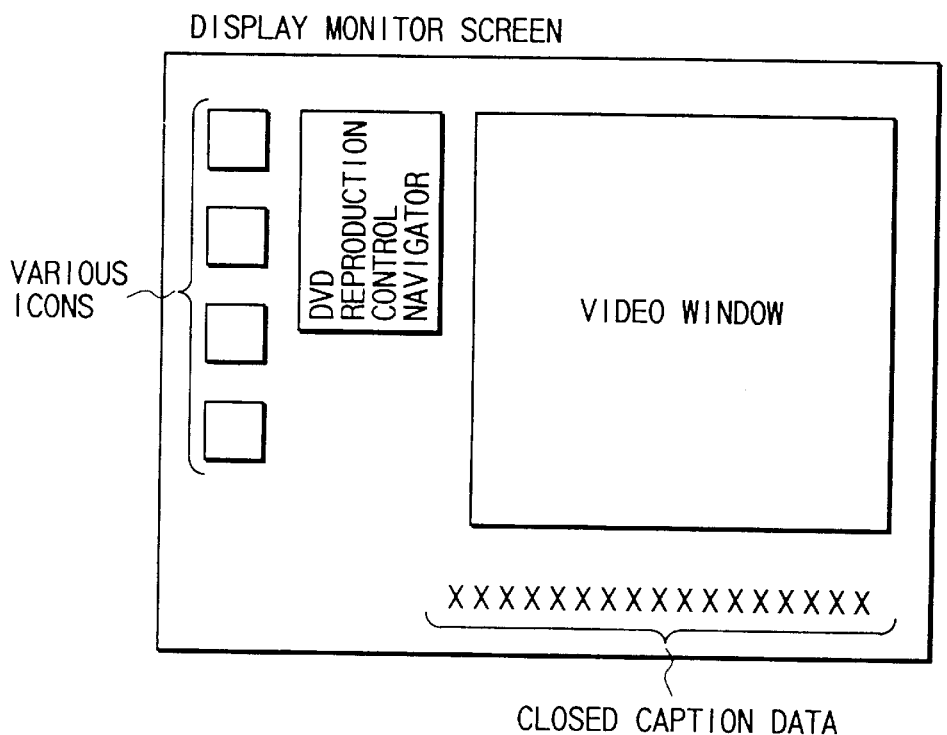
FIG. 8 shows the first example of a closed caption display screen used in the system of the embodiment shown in FIG. 1.

FIG. 8 shows an example of the display screen when closed caption data is displayed using the OSD function of the VGA controller 113.

As shown in FIG. 8, the display screen of the display monitor displays character information designated by an OSD command as closed caption data in addition to a video window on which video data decoded by the DVD decoder 112 is displayed, and a DVD reproduction control navigator window used as a GUI for receiving various user's reproduction instructions to the DVD reproduction control program.

The display position and character color of caption data based on the OSD command can be changed by setting up software such as the DVD reproduction control program.

Figure 9:
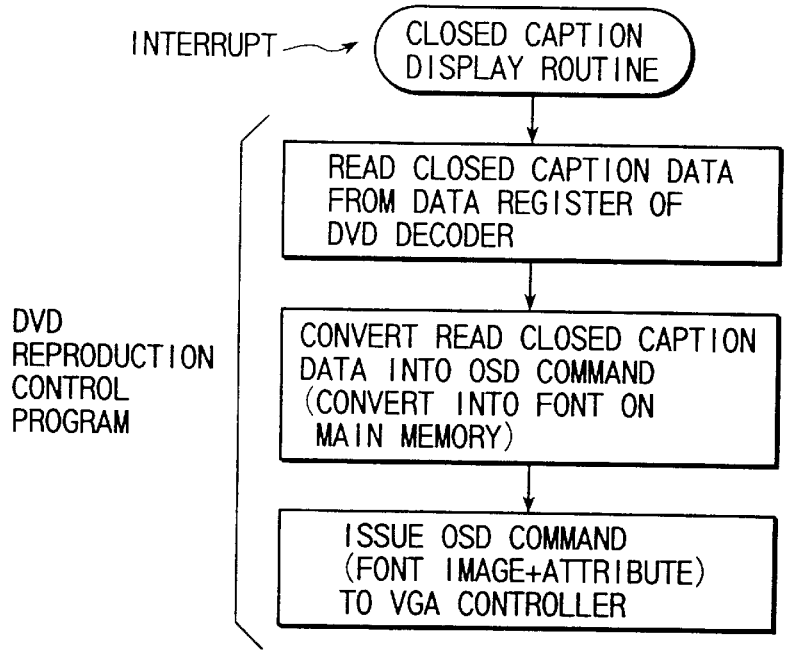
FIG. 9 is a flow chart showing the first sequence of the closed caption display processing used in the system of the embodiment shown in FIG. 1.

FIG. 9 is a flow chart showing the processing sequence of the closed caption display routine in the DVD reproduction control program started in response to an interrupt signal from the DVD decoder 112.

As described above, when the line 21 data detector 112a has detected line 21 data from an MPEG2 program stream, the flag is set in the detection flag register 112c, and the line 21 data is extracted from the stream and is set in the data register 112d. When the flag is set in the detection flag register 112c, the interrupt generator 112b generates an interrupt signal (INTA). In response to this signal, the closed caption display routine in the DVD reproduction control program is called.

The closed caption display routine clears the flag set in the detection flag register 112c and reads out closed caption data (line 21 data) stored in the data register 112d onto the main memory 12 (step S101).

The closed caption display routine then renders a character code of the readout closed caption data as a font image into the main memory, and converts that data into an OSD command for instructing display of the character information corresponding to the closed caption data (step S102). After that, the closed caption display routine issues, via the PCI bus 10, the OSD command (including the font image, and attribute information indicating the character color and display position) to the VGA controller 113 directly or via an OSD driver in the display driver 116 (step S103).
(Closed Caption Data Display Method 2)

The second display method of closed caption data will be explained below while exemplifying a case wherein character information is rendered into the VRAM 20.

Figure 10:
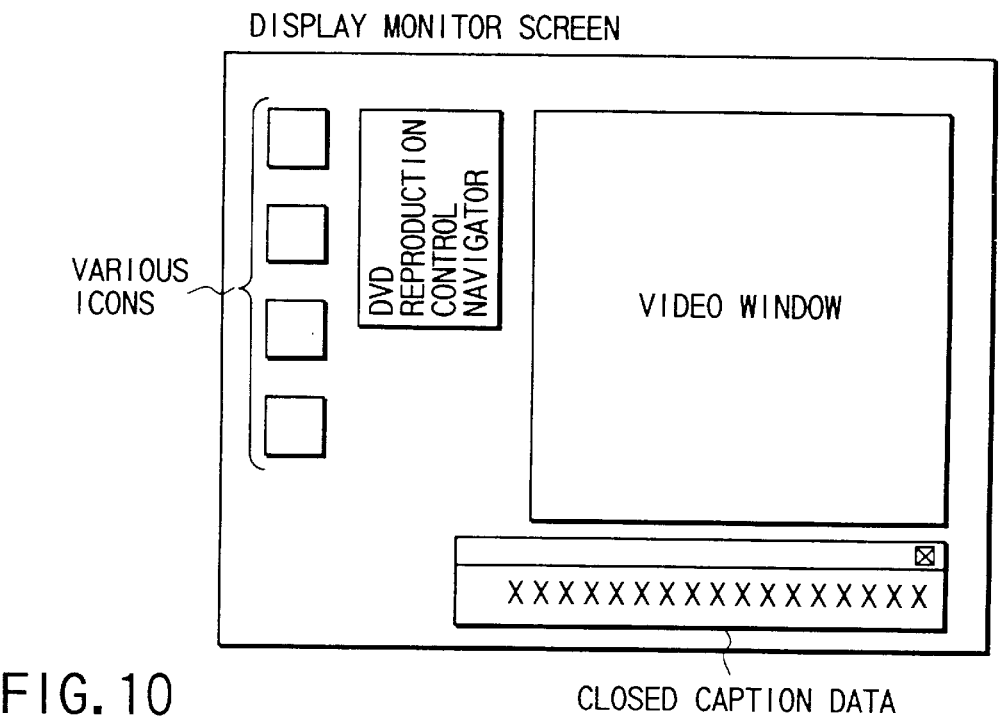
FIG. 10 shows the second example of a closed caption display screen used in the system of the embodiment shown in FIG. 1.

FIG. 10 shows an example of the display screen when closed caption data is displayed by rendering character information into the VRAM 20.

As shown in FIG. 10, the display screen of the display monitor displays a closed caption window for displaying character information rendered into the VRAM 20 in addition to a video window on which video data decoded by the DVD decoder 112 is displayed, and a DVD reproduction control navigator window used as a GUI for receiving various user's reproduction instructions to the DVD reproduction control program.

The closed caption window is an application window opened by the DVD reproduction control program, and the size, color, and font of characters to be displayed on the closed caption window can be freely set. The user can desirably move the display position of the closed caption window using a mouse.

Figure 11:
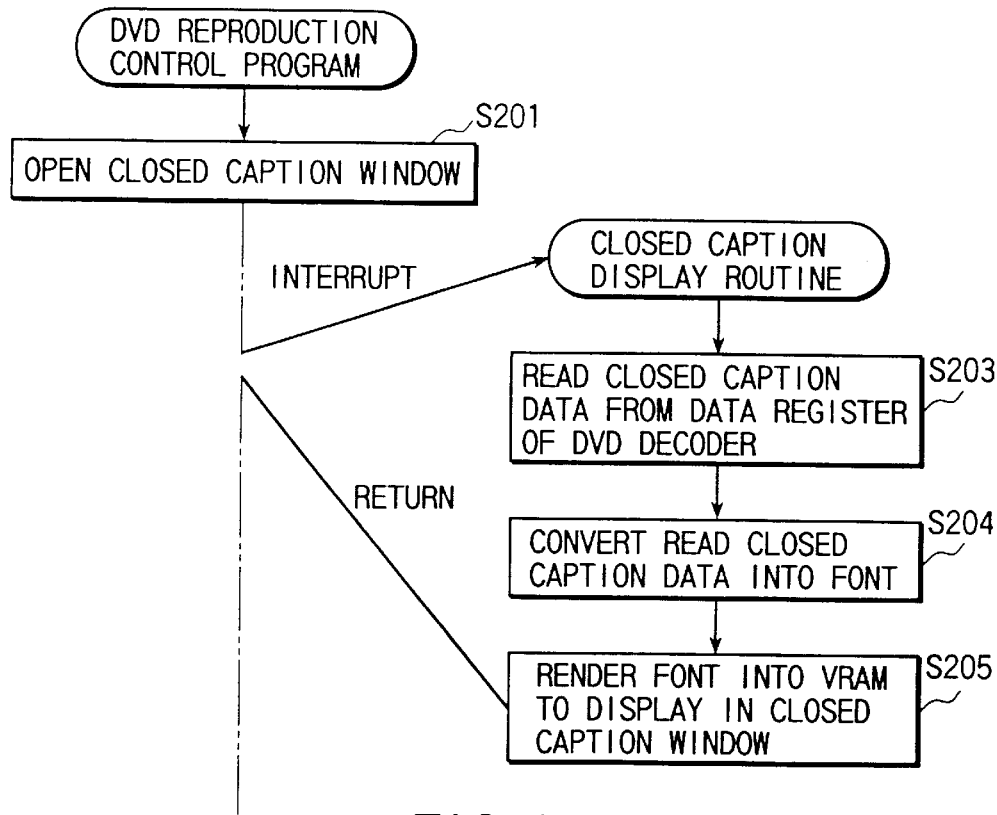
FIG. 11 is a flow chart showing the second sequence of the closed caption display processing used in the system of the embodiment shown in FIG. 1.

FIG. 11 is a flow chart showing the processing sequence of the closed caption display routine in the DVD reproduction control program started in response to an interrupt signal from the DVD decoder 112.

The DVD reproduction control program opens the closed caption window on the screen of the display monitor using the APIs of the OS and display driver 116 (step S201).

When the closed caption display routine in the DVD reproduction control program is called in response to an interrupt signal (INTA) from the interrupt generator 112b, it clears the flag set in the detection flag register 112c, and reads out closed caption data (line 21 data) stored in the data register 112d onto the main memory 12 (step S203).

The closed caption display routine then converts a character code of the readout closed caption data into an image of a character font on the main memory 12 (step S204). The character information is displayed within the closed caption window by directly rendering the converted font image into the VRAM 20 via the PCI bus 10 or making the VGA controller 113 render it into the VRAM 20 (step S205).
(Closed Caption Data Display Method 3)

The third display method of closed caption data will be explained below while taking as an example a case wherein language translation is built in the first or second display method mentioned above.

Figure 12:
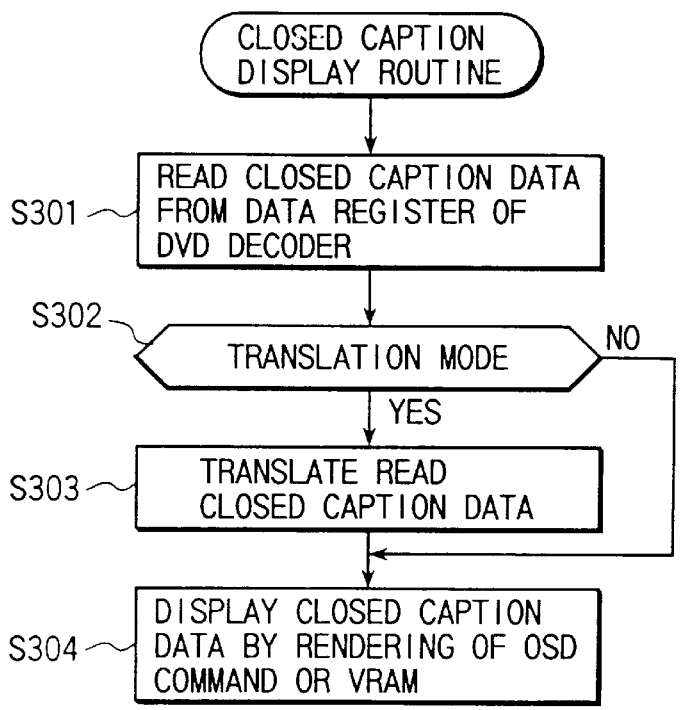
FIG. 12 is a flow chart showing the third sequence of the closed caption display processing used in the system of the embodiment shown in FIG. 1.

FIG. 12 is a flow chart of this method.

When the closed caption display routine in the DVD reproduction control program is called in response to an interrupt signal (INTA) from the interrupt generator 112b, it clears the flag set in the detection flag register 112c, and reads out closed caption data (line 21 data) stored in the data register 112d onto the main memory 12 (step S301).

The closed caption display routine then checks if the user has designated a translation mode for translating closed caption data in one language into another language in another specific country (step S302). If the translation mode has been designated, the routine translates the closed caption data using a translation dictionary (step S304). The closed caption display routine displays the translated character information as closed caption data by issuing an OSD command for instructing display of the character information corresponding to the translation result or rendering that character information into the VRAM 20 (step S305).
(Closed Caption Data Display Method 4)

The fourth display method of closed caption data will be explained below taking as an example a case wherein the DVD decoder 112 is provided with an OSD function, and video data synthesized with character information is transferred from the DVD decoder 112 to the VGA controller 113.

Figure 13:
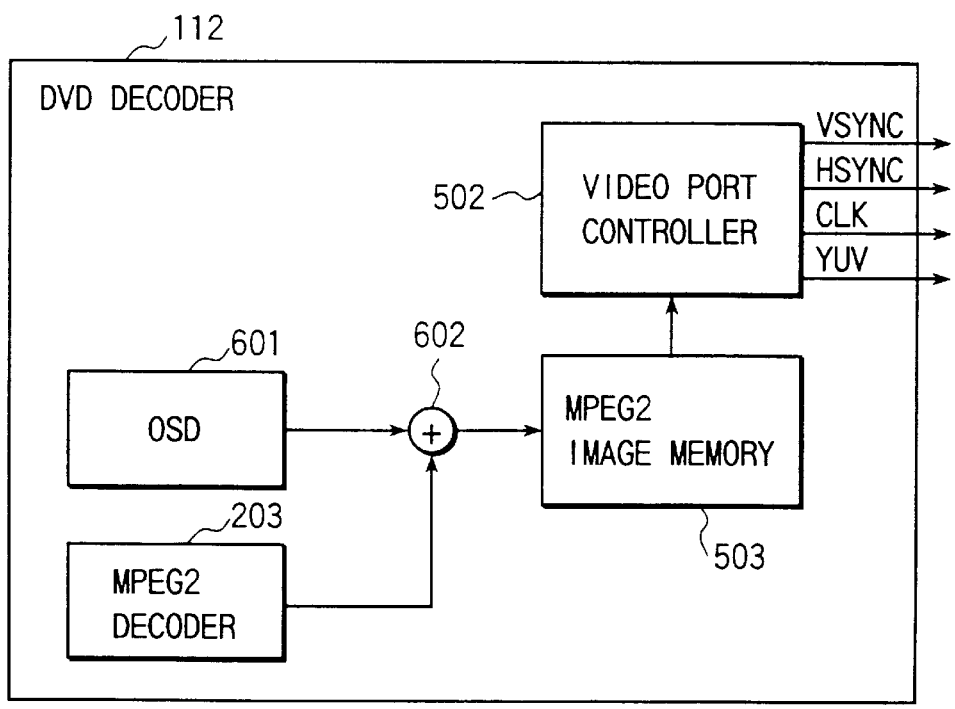
FIG. 13 is a diagram for explaining an OSD function arranged in the DVD decoder used in the system of the embodiment shown in FIG. 1.

FIG. 13 shows an example of the arrangement of the DVD decoder 112 including the OSD function.

Figure 14:
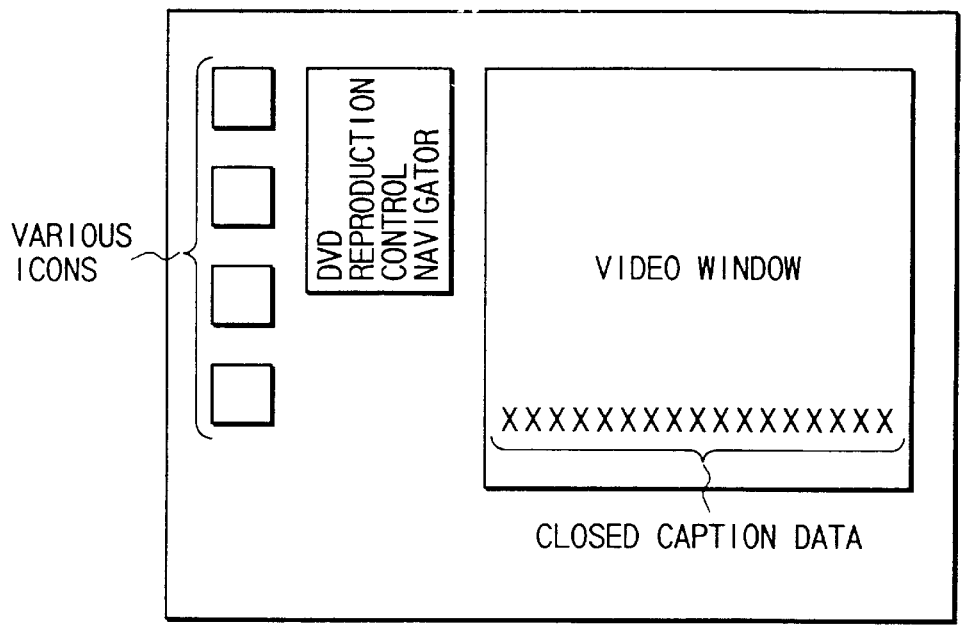
FIG. 14 shows the third example of a closed caption display screen used in the system of the embodiment shown in FIG. 1.

An OSD circuit 601 interprets an OSD command from the CPU 11, and outputs display character information designated by the OSD command. The image of this character information is synthesized on video data decoded by the MPEG2 decoder 203 by a synthesizing circuit 602 comprising, e.g., an a blending circuit or the like, and the synthesized data is stored in a frame buffer of the MPEG2 image memory 503. Frame data of the video data synthesized with the character information is read out from the MPEG2 image memory 503 onto the video port controller 502, and is then input to the video input port of the VGA controller 113. In this case, the display screen of the display monitor is as shown in FIG. 14, and closed caption data consisting of character information is displayed within the video window.

Figure 15:
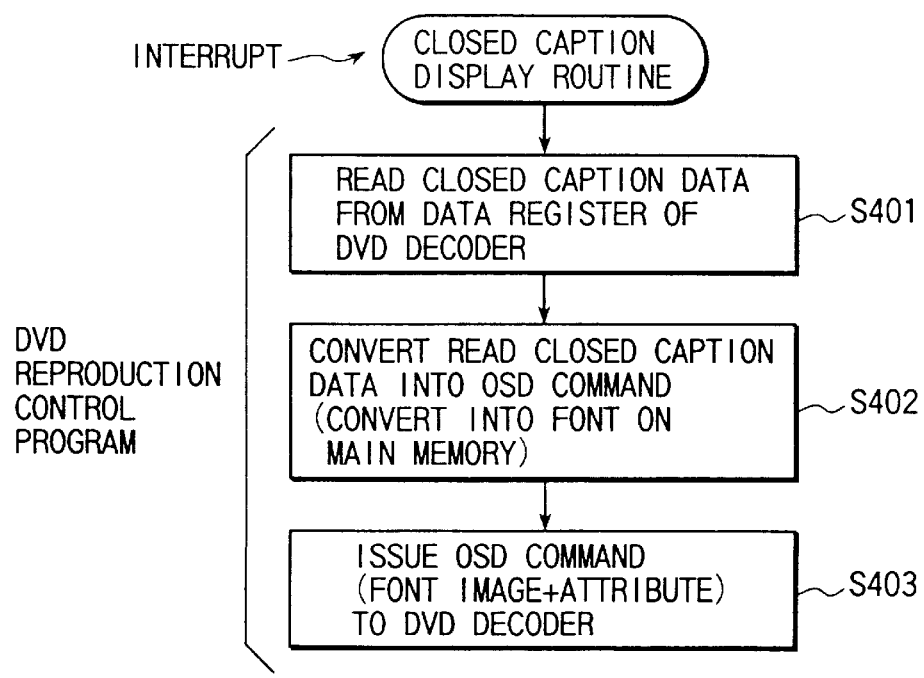
FIG. 15 is a flow chart showing the fourth sequence of the closed caption display processing used in the system of the embodiment shown in FIG. 1.

FIG. 15 is a flow chart showing the sequence for displaying closed caption data using the OSD function of the DVD decoder 112.

As described above, when the line 21 data detector 112a has detected line 21 data from an MPEG2 stream, the flag is set in the detection flag register 112c. Furthermore, the line 21 data is extracted from the stream, and is set in the data register 112d. When the flag is set in the detection flag register 112c, the interrupt generator 112b generates an interrupt signal (INTA). In response to this signal, the closed caption display routine in the DVD reproduction control program is called.

The closed caption display routine clears the flag set in the detection flag register 112c and reads out closed caption data (line 21 data) stored in the data register 112d onto the main memory 12 (step S401).

The closed caption display routine renders the readout closed caption data into a font image on the main memory 12, and converts that data into an OSD command for instructing display of the character information corresponding to the closed caption data (step S402). The closed caption display routine issues the OSD command (including the font image, and attribute information indicating the character color and display position) to the DVD decoder 112 (step S403). Based on this command, the character information is synthesized on the video data in the DVD decoder 112, and the synthesized data is input to the VGA controller 113 and is displayed on the video window of the display monitor.

In the above-mentioned first, second, third, and fourth display methods, the closed caption display routine is called in response to the interrupt signal generated upon detection of line 21 data. Alternatively, the closed caption display routine may be called by periodically generating an interrupt signal for each vertical synchronization signal. In this case, the closed caption display routine initially checks if the flag is set in the detection flag register 112c, and immediately returns the control to the interrupt source if the flag is not set.

As described above, in this embodiment, the line 21 data detector of the DVD decoder 112 detects line 21 data contained in an encoded stream, and passes the detected line 21 data to software in response to an interrupt signal. Closed caption data can be displayed on the display monitor of the computer by controlling the VGA controller 113 or DVD decoder 112 under the control of that software.

Not only closed caption data contained in MPEG2 stream data read out from the DVD-ROM drive 111 but also closed caption data contained as line 21 data in MPEG2 stream data received by the satellite tuner 14 can be similarly displayed.

Figure 16:
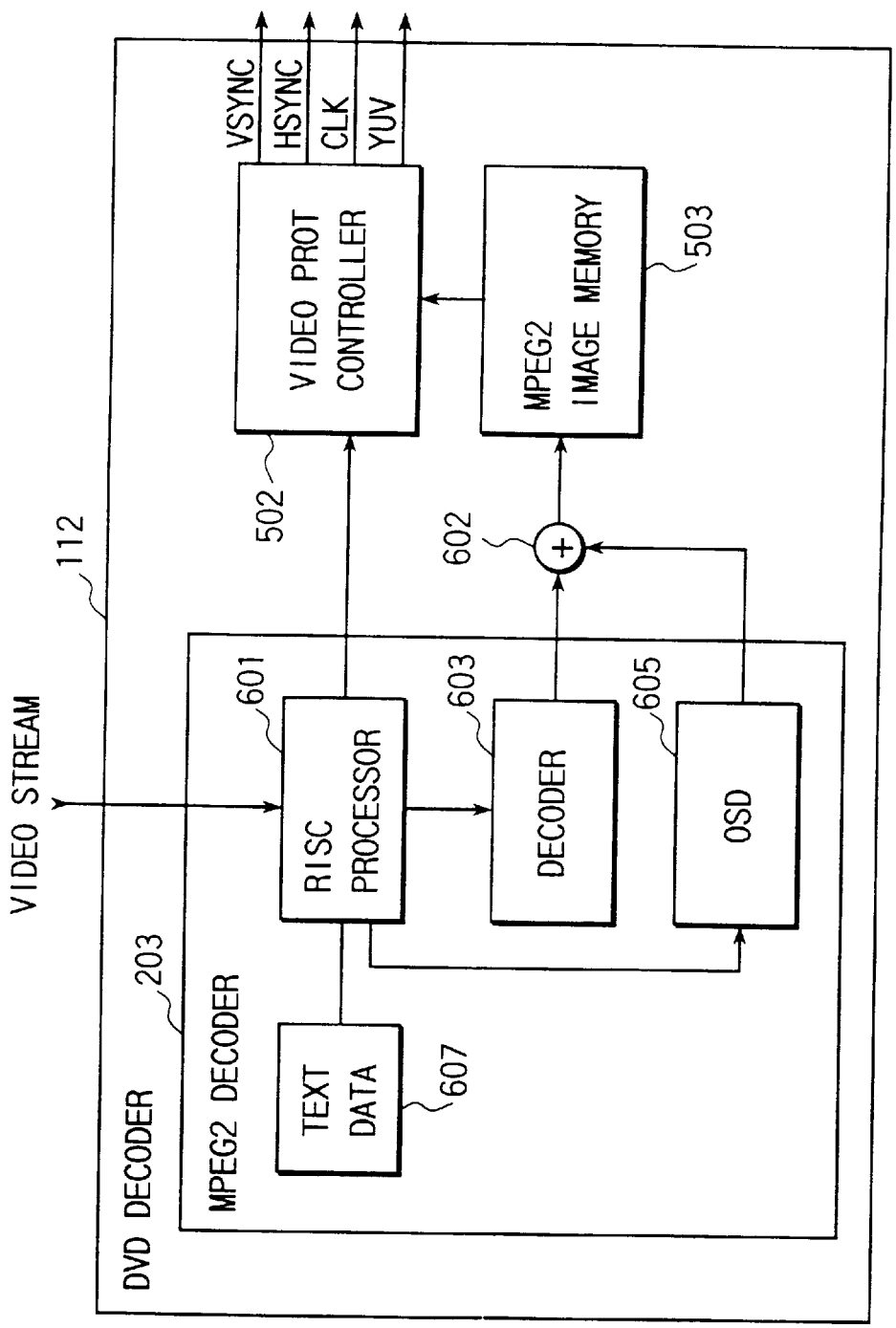
FIG. 16 is a detailed block diagram of a DVD decoder according to the second embodiment of the present invention.

The second embodiment of the present invention will be described below with reference to FIGS. 16 and 17. FIG. 16 is a detailed block diagram showing the second embodiment of the MPEG2 decoder shown in FIG. 7, and FIG. 17 is a flow chart showing the operation of the MPEG2 decoder 203 shown in FIG. 16.

In the first embodiment described above, motion picture data and closed caption data are synthesized in the VGA controller 113. More specifically, in case of the above-mentioned embodiment, the video stream supplied from the DVD—ROM drive 111 is temporarily input to the DVD decoder since it is copy-protected. The DVD decoder cancels the copy protection, and when it detects that some packets in that stream correspond to closed caption information, the decoder informs the DVD drivers 114 of the detection result. The drivers extract closed caption information alone from the contents of the buffer in the DVD decoder 112, and pass it to the DVD application. The DVD application converts text data of the closed caption information into bitmap data, and passes the bitmap data and its display location to the display driver 116. The display driver sends these data to the VGA controller 113. The VGA controller synthesizes motion picture data supplied from the DVD decoder 112, and the bitmap data of the closed caption information supplied from the display driver 116, and outputs the synthesized data to the display device.

For this reason, a time lag is produced between the motion picture data and closed caption data, thus often losing synchronization. Also, the closed caption data can be displayed on the display screen of the personal computer but cannot be displayed on the television receiver.

Figure 17:
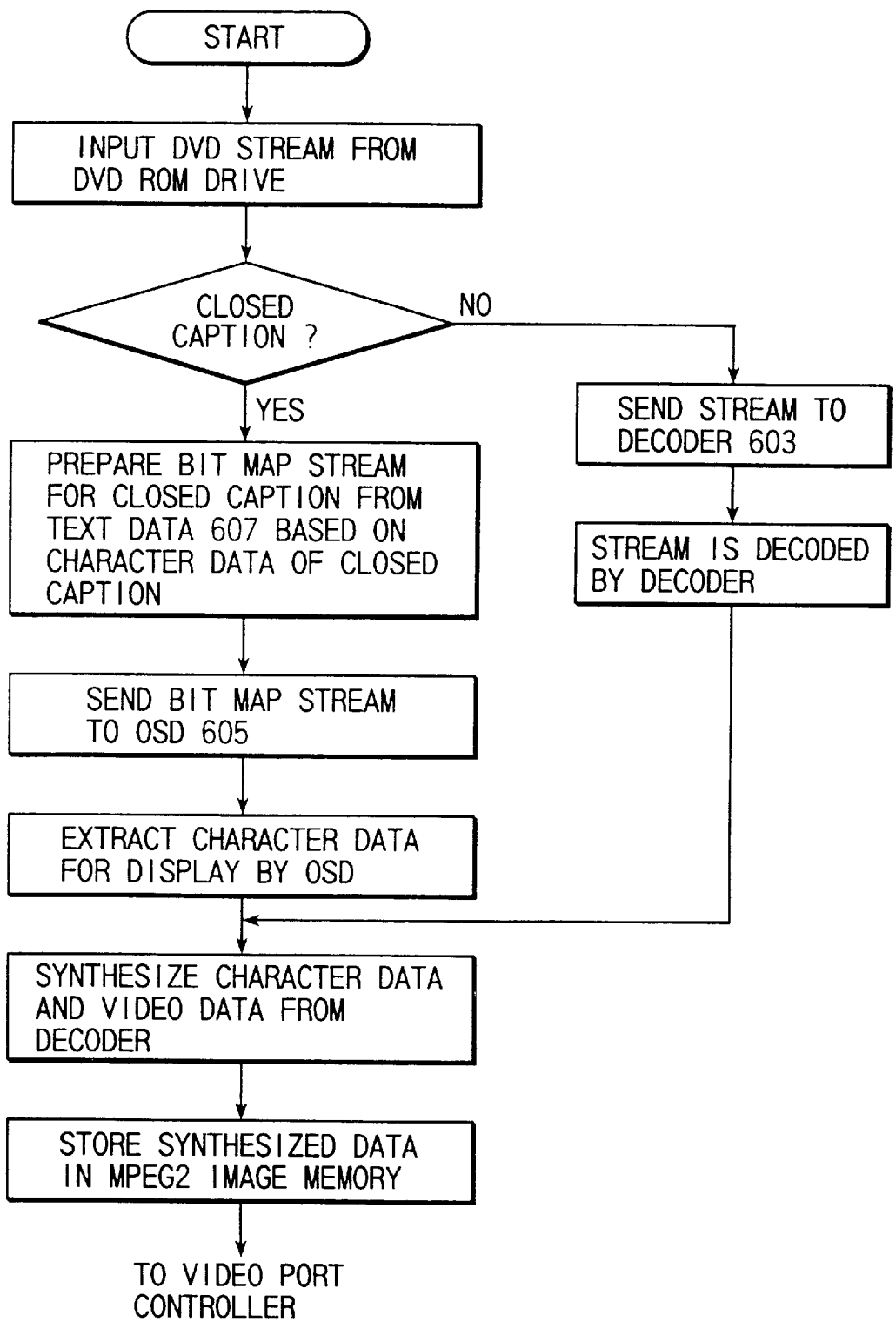
FIG. 17 is a flow chart showing the operation of the DVD decoder shown in FIG. 16.

By contrast, in the embodiment shown in FIGS. 16 and 17, since the DVD decoder synthesizes motion picture data and closed caption data therein, synchronization can be prevented from being lost, and the closed caption data can also be displayed on the television receiver.

The MPEG2 decoder shown in FIG. 16 comprises a RISC processor chip 601, decoder 603, OSD circuit 605, and TEXT DATA 607. In FIG. 16, the RISC processor 601 detects packets containing closed caption information (text data) from the input video stream. In this embodiment, the processor 601 comprises a RISC processor, but may comprise other processors such as a microcontrolled processor and the like. The TEXT DATA 607 is a bitmap file used for converting the closed caption information detected by the RISC processor 601 and consisting of text data into bitmap data.

The decoder 605 decodes video data supplied from the RISC processor 601. The OSD circuit 605 performs color key conversion and the like of the closed caption information supplied from the RISC processor 601 and consisting of the bitmap data, and outputs the processed information to a synthesizing circuit 602.

The operation of the MPEG2 decoder 203 will be explained below also with reference to FIG. 17.

A video data stream read out from the DVD-ROM drive 111 is supplied to the RISC processor 601 in the MPEG2 decoder 203 (S501). The RISC processor 601 checks VIDEO packets in each VIDEO pack in the input video stream to detect if they store closed caption information (S502). Upon detecting packets that store closed caption information, the RISC processor 601 reads bitmap data corresponding to text data that forms the detected closed caption information from the TEXT DATA 607 to prepare a bitmap stream of the closed caption information (S503). The RISC processor 601 sends the prepared bitmap stream of the closed caption information to the OSD circuit 605. The OSD circuit 605 performs color key conversion and the like of the closed caption data in the supplied bitmap data, and sends the converted data to the synthesizing circuit 602 (S504).

If the RISC processor 601 determines in step S502 that packet data does not contain closed caption data, it sends the video packet to the decoder 605 (S506). The decoder 603 decodes a video data stream supplied from the RISC processor 601, and sends the decoded data to the synthesizing circuit 602 (S507). As has been described above with the aid of FIG. 13, the synthesizing circuit 602 synthesizes the display character information supplied from the OSD circuit 605 on the video data supplied from the decoder 603, and outputs the synthesized data to the MPEG2 image memory 503. The video data for one frame synthesized with the character information and stored in the MPEG2 image memory 503 is read out and is sent to the video port controller 502, and is then supplied to the video input port of the VGA controller 113 via the video bus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer system comprising:
a CPU for issuing an on-screen display command for designating display of character information;
a decoder for decoding data into decoded video data, said decoder including:
an on-screen display circuit for interpreting the on-screen display command from said CPU, and outputting display character information designated by the on-screen display command;
a synthesizing circuit for synthesizing font data of the character information on said decoded video data, into synthesized video data;
wherein said synthesizing circuit comprises an a blending circuit;
an image memory for storing synthesized video data output from said synthesizing circuit; and
a display controller for reading out the synthesized video data from said image memory, and displaying the character information in a video window on a display screen.

2. A computer system comprising:
means for decoding coded data into decoded data, the decoded data including video data;
means for detecting closed caption character data from at least one of the decoded video data and the coded data;
means for converting the closed caption character data into character information;
means for synthesizing fort data of the character information on the decoded video data;
wherein said synthesizing means comprises an a blending circuit;
means for displaying, on a display monitor, an image in which the decoded data inputted from the decoding means and the character information inputted from the converting means are synthesized;
means for translating the character information into another language;
wherein the displaying means displays the translated character information into another language; and
wherein the displaying means displays the translated character information on the display monitor.

3. A computer system having a display monitor comprising:
means for decoding coded data into decoded data including video data and closed caption character data;
means for detecting the closed caption character data from at least one of the decoded data and the coded data;
means for converting the closed caption character data inputted from the decoding means into character information;
an image memory for storing the video data inputted from the decoding means and the character information inputted from the converting means;
means for synthesizing font data of the character information on the decoded video data;
wherein said synthesizing means comprises an a blending circuit;
means for displaying, on the display monitor, an image in which the video data and the character information stored in the image memory are synthesized;
means for translating the character information into another language; and
wherein the displaying means displays the translated character information on the display monitor.

4. A computer system having a display monitor comprising:
means for decoding coded data into decoded data including video data and closed caption character data;
means for detecting the closed caption character data from at least one of the decoded and coded data;
means for converting the closed caption character data into closed caption bitmap data;
an on-screen display circuit for performing at least color key conversion of the closed caption bitmap data;
means for synthesizing decoded data outputted from the decoder and the converted closed caption bitmap data outputted from the on-screen display circuit;
wherein said synthesizing means comprises an a blending circuit;
an image memory for storing the synthesized data inputted from the synthesizing means; and
means for displaying synthesized data stored in the image memory on the display monitor.

5. A computer system comprising:
a decoder for decoding data including:
means for detecting closed caption character data from the data or decoded result data thereof; and
means for issuing a signal to pass the detected closed caption character data to the display controller;
a display controller having a video input port for receiving data decoded by said decoder, the display controller capable of displaying data input from said video input port on a display monitor;
output means for acquiring the closed caption character data from the decoder and outputting the character data to the display controller in response to the signal;
a display monitor for displaying character information corresponding to the acquired closed caption data;
means for synthesizing character information on the received decoded data;
wherein said synthesizing means comprises an a blending circuit; and
means for translating character data corresponding to the closed caption character data into another language, wherein the translated character information is displayed on said display monitor.

6. A computer system comprising:
a decoder for decoding data;
a display controller having a video input port for receiving data decoded by said decoder, the display controller capable of displaying data input from said video input port on a display monitor;
means for detecting closed caption character data from the data or decoded result data thereof;
means for issuing a signal to pass the detected closed caption character data to the display controller;
means for converting the detected closed caption character data into closed caption bitmap data;
an on-screen display circuit for performing at least color key conversion of the closed caption bitmap data;
means for synthesizing decoded data output from the decoder and the closed caption bitmap data from the on-screen display circuit, the decoded data and the closed caption bitmap data being synthesized inside said decoder;

wherein said synthesizing means comprises an a blending circuit;

output means for acquiring the closed caption character data from said decoder and outputting the character data to said display controller in response to the signal; and a display monitor for displaying character information corresponding to the acquired closed caption character data.

7. A closed caption display method used in a computer system having a decoder for decoding data and a display controller which has a video input port for receiving data decoded by the decoder and the display controller displays data input from said video input port on a display screen of a display monitor which displays graphics data stored in an image memory, the method comprising the steps of:

detecting a closed caption code from closed caption character data or decoded result data thereof by a processor in said decoder;

acquiring the detected closed caption character data from said decoder;

generating a bitmap stream of closed caption information from the closed caption code with reference to a bitmap file in said decoder;

synthesizing decoded data and the bitmap stream of the closed caption information by a synthesizing circuit in said decoder;

wherein the decoded data and the bitmap stream are synthesized using an a blending circuit; and displaying the closed caption character information on said display monitor by outputting the synthesized image data to said display controller.

8. A computer system comprising:

an image memory for storing image data;

a decoder for decoding data, said decoder including:

a detecting circuit for detecting closed caption character data from digitally compressed and encoded data or decoded result data thereof; and means for generating a signal in response to the detection of the closed caption character data;

means for converting the closed caption character data into font data and writing the font data into said image memory in response to the signal;

means for translating the font data into another language;

means for issuing an on-screen display command for instructing display of the translated font data;

means for synthesizing the translated font data on the decoded data into synthesized image data;

wherein the synthesizing means comprises an a blending circuit; and a display controller for displaying, in response to the issued on-screen command, the synthesized image data.

9. A computer system comprising:

an image memory for storing image data;

a decoder for decoding data said decoder including:

a detecting circuit for detecting closed caption character data from the digitally compressed and encoded data or decoded result data thereof; and means for generating a signal in response to the detection of the closed caption character data;

means for converting the closed caption character data into font data;

means for translating the font data into another language;

means for writing the translated font data in said image memory;

means for synthesizing the translated font data on the decoded data into synthesized image data;

wherein the synthesizing means comprises an a blending circuit; and a display controller for displaying the synthesized image data written in said image memory.

* * * * *